(12) United States Patent
Schaich

(10) Patent No.: US 12,078,297 B2
(45) Date of Patent: Sep. 3, 2024

(54) TANK DEVICE FOR STORING A GASEOUS MEDIUM, COMPRISING A VALVE DEVICE

(71) Applicant: Robert Bosch GmbH, Stuttgart (DE)

(72) Inventor: Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/245,312

(22) PCT Filed: Aug. 12, 2021

(86) PCT No.: PCT/EP2021/072516
§ 371 (c)(1),
(2) Date: Mar. 14, 2023

(87) PCT Pub. No.: WO2022/063485
PCT Pub. Date: Mar. 31, 2022

(65) Prior Publication Data
US 2024/0077176 A1 Mar. 7, 2024

(30) Foreign Application Priority Data
Sep. 23, 2020 (DE) .................. 10 2020 211 862.0

(51) Int. Cl.
*F17C 13/04* (2006.01)
*F16K 27/02* (2006.01)
*F16K 31/08* (2006.01)

(52) U.S. Cl.
CPC ............ *F17C 13/04* (2013.01); *F16K 27/029* (2013.01); *F16K 31/082* (2013.01); *F17C 2221/012* (2013.01)

(58) Field of Classification Search
CPC .. F17C 13/04; F17C 2221/012; F16K 27/029; F16K 31/082
See application file for complete search history.

(56) References Cited

U.S. PATENT DOCUMENTS

| 4,540,154 A | 9/1985 | Kolchinsky et al. |
| 5,169,117 A * | 12/1992 | Huang .................. F16K 31/086 |
| | | 251/38 |

(Continued)

FOREIGN PATENT DOCUMENTS

| DE | 102012210943 A1 | 1/2014 |
| DE | 102018201055 A1 | 7/2019 |

(Continued)

OTHER PUBLICATIONS

Translation of International Search Report for Application No. PCT/EP2021/072516 dated Dec. 1, 2021 (2 pages).

(Continued)

*Primary Examiner* — Eric Keasel
(74) *Attorney, Agent, or Firm* — Michael Best & Friedrich LLP

(57) ABSTRACT

The invention relates to a tank device (1) for storing a gaseous medium, in particular hydrogen, comprising a valve device (100) and a tank container (200), wherein the valve device (100) comprises a valve housing (102), in which valve housing (102) a pilot valve element (24) that can be moved along a longitudinal axis (101) of the tank container (100) is disposed. The pilot valve element (24) cooperates with a first sealing seat (18) to open and close a passage opening (20) and thus forms a pilot valve (240), wherein the valve device (2) comprises a solenoid coil (32) by means of which solenoid coil (32) the pilot valve element (24) can be moved along the longitudinal axis (101) of the tank device (1). A main valve element (12) is furthermore disposed in the valve housing (102), which main valve element (12) cooperates with a second sealing seat (6) to open and close a passage opening (8) and thus forms a main valve (120), wherein the second sealing seat (6) is configured as a conical shoulder (36) on the valve housing (102). In addition, a permanent magnet (17) is disposed at one end (42) of the (Continued)

pilot valve element (24), which permanent magnet (17) is disposed in the valve device (100) such that a positive pole element (170) of the permanent magnet (17) is disposed in the direction of a housing cover (28) of the valve device (100) and a negative pole element (171) of the permanent magnet (17) is disposed in the direction of the tank container (200), wherein the permanent magnet (17) is disposed in a positive pole region (51) of a permanent magnetic field (52) generated by the solenoid coil (32) when the solenoid coil (32) is energized.

16 Claims, 2 Drawing Sheets

(56) References Cited

U.S. PATENT DOCUMENTS

| | | | | |
|---|---|---|---|---|
| 5,197,710 | A | 3/1993 | Wass et al. | |
| 6,830,230 | B2* | 12/2004 | Simoens | B65D 88/703 251/360 |
| 6,962,317 | B2* | 11/2005 | Simoens | B65D 88/703 251/30.04 |
| 7,080,817 | B2* | 7/2006 | Stern | F16K 31/404 251/129.17 |
| 8,151,819 | B2 | 4/2012 | Suzuki et al. | |
| 10,161,360 | B2 | 12/2018 | Ninomiya et al. | |
| 11,808,552 | B1* | 11/2023 | Italia | F42C 19/083 |
| 2007/0090317 | A1 | 4/2007 | Kamiya et al. | |
| 2009/0236551 | A1 | 9/2009 | Nomichi et al. | |
| 2011/0068286 | A1 | 3/2011 | Nomichi et al. | |
| 2012/0199775 | A1 | 8/2012 | Watanabe | |
| 2016/0208954 | A1 | 7/2016 | Ito et al. | |
| 2016/0305572 | A1 | 10/2016 | Becker et al. | |

FOREIGN PATENT DOCUMENTS

| | | |
|---|---|---|
| EP | 0195206 A1 | 9/1986 |
| EP | 0668468 B1 | 9/1999 |
| FR | 2544834 A1 | 10/1984 |
| JP | 2002039429 A | 2/2002 |
| JP | 2009210120 A | 9/2009 |
| JP | 2010121728 A | 6/2010 |
| JP | 2012189107 A | 10/2012 |
| JP | 2014214804 A | 11/2014 |
| JP | 2023526126 A | 6/2023 |
| JP | 2023539904 A | 9/2023 |
| JP | 2023539911 A | 9/2023 |
| KR | 100766872 B1 | 10/2007 |
| KR | 20140079627 A | 6/2014 |
| WO | 2013031191 A1 | 3/2013 |
| WO | 2015129159 A1 | 9/2015 |

OTHER PUBLICATIONS

Office of Energy Efficiency & Renewable Energy, "Fuel Cells," <https://www.energy.gov/eere/fuelcells/fuel-cells#:~:text=A%20fule%20cell%20consists%20of,is%20fed%20to%20the%20cathode> web page visited Apr. 29, 2024 (4 pages).

* cited by examiner

TANK DEVICE FOR STORING A GASEOUS MEDIUM, COMPRISING A VALVE DEVICE

BACKGROUND

The invention relates to a tank device having a valve device, in particular for storing hydrogen, for example for use in vehicles having a fuel cell drive or in vehicles having a hydrogen burner as the drive.

DE 10 2018 201 055 A1 describes a tank device having at least two storage units, which each comprise a control valve and which are connected via a line system to an output line. At least one control valve of at least one storage unit is configured as a main valve, and at least one control valve of at least one storage unit is configured as a secondary valve, whereby the main valve and the secondary valve are configured differently.

The safety devices for such a tank device are standardized. Each tank device has to have such a shut-off valve. In the event of damage to the tank device caused by an accident involving the vehicle having a fuel cell drive, for example, or if a line of the tank device ruptures, the shut-off valve can close the tank containers so that no gas can escape from the tank device.

Due to the high safety requirements for the shut-off valves and due to high system pressures of, for example, 800 bar or more, such shut-off valves are very challenging in terms of their structure and require a large amount of installation space. This in turn increases the overall weight of the tank device as a whole, which, in the event of an accident involving the vehicle having a fuel cell drive, for example, can lead to the occurrence of high acceleration forces and possible deformations of the valve device or the tank device.

SUMMARY

The tank device according to the invention, on the other hand, has the advantage that a tank device which comprises a compactly designed safety valve having low opening forces is provided in a structurally simple and cost-saving manner.

For this purpose, the tank device for storing a gaseous medium, in particular hydrogen, comprises a valve device and a tank container. The valve device comprises a valve housing in which valve housing a pilot valve element that can be moved along a longitudinal axis of the tank device is disposed. The pilot valve element cooperates with a first sealing seat to open and close a passage opening and thus forms a pilot valve. The valve device further includes a solenoid coil, by means of which solenoid coil the pilot valve element can be moved along the longitudinal axis of the tank device. A main valve element is disposed in the valve housing, which main valve element cooperates with a second sealing seat to open and close a passage opening and thus forms a main valve, wherein the second sealing seat is configured as a conical shoulder on the valve housing. A permanent magnet is moreover disposed at one end of the pilot valve element, which permanent magnet is disposed in the valve device such that a positive pole element of the permanent magnet is disposed in the direction of a housing cover of the valve device and a negative pole element of the permanent magnet is disposed in the direction of the tank container. The permanent magnet is furthermore disposed in a positive pole region of a permanent magnet field generated by the solenoid coil when the solenoid coil is energized.

An optimum configuration of the magnetic flux can thus be achieved in a simple manner. A two-stage opening process also requires only a small magnetic force to open the valve device. Thus, a low power and energy requirement, and with it a positive energy balance, is achieved.

In a first advantageous further development of the invention, it is provided that the valve device can be opened in the direction of the tank container when the solenoid coil is energized. A structurally simple and cost-efficient tank device is thus achieved.

In a further embodiment of the invention, it is advantageously provided that, between the valve housing and a projection of the main valve element, which projection cooperates with the second sealing seat to open and close the passage opening, a throttle channel is configured, which throttle channel has a conical widening counter to the direction of the second sealing seat by means of which a throttle effect is created.

In an advantageous further development of the invention, it is provided that the passage opening in the valve housing is configured at the level of the throttle channel and opens into the throttle channel. A chamber is advantageously configured in the valve housing, which chamber is connected to the throttle channel by means of the passage opening. The opening process of the valve device is thus facilitated in a structurally simple manner.

In an advantageous further development of the invention, it is advantageously provided that the valve device is disposed in a neck region of the tank device and is pressed against a tank base within the neck region. The structural design of the valve device within the neck region produces a smaller pressure contact surface, which results in lower axial pressure forces. At high pressures, smaller pressure contact surfaces provide high relief in terms of component loads, which is reflected in lesser deformations, less wear and tightness effects and an increased service life of the tank device and the valve device as a whole.

In a further embodiment of the invention, it is advantageously provided that a removal opening which fluidically connects a tank container interior and the chamber is configured in the tank base. The interior of the valve device can thus be connected to a tank interior of the tank device in a structurally simple manner.

In an advantageous further development of the invention, it is provided that the pilot valve element comprises a shoulder, on which shoulder a spring is supported and applies a force to the pilot valve element in the direction of the one end of the pilot valve element.

In a further embodiment of the invention, it is advantageously provided that the first sealing seat is configured on the main valve element.

In an advantageous further development of the invention, it is provided that the main valve element is subjected to a force in the direction of the tank container interior by means of a spring, whereby the main valve element is subjected to a force in the direction of the first sealing seat and counter to the direction of the second sealing seat.

In a further embodiment of the invention, it is advantageously provided that an interior space is configured in the valve housing, which interior space is divided by the main valve element into a first partial interior space and a second partial interior space.

In an advantageous further development of the invention, it is provided that the first partial interior space is connected by means of a spill channel configured in the valve housing to an inflow line which can be connected to an inflow region of a consumer system.

This makes it possible to facilitate the opening process of the valve device, which requires low magnetic forces because the opening process is supported by pneumatic forces as a result of the structural design of the valve device.

In a further embodiment of the invention, it is advantageously provided that the first partial interior space and the second partial interior space are fluidically connectable by means of the first sealing seat and/or the second sealing seat.

The described tank device is preferably suited for use in a fuel cell system for storing hydrogen for operating a fuel cell.

The described tank device for storing hydrogen for operating a fuel cell is furthermore advantageously suited for use in a fuel cell-powered vehicle.

The described device for storing hydrogen is furthermore advantageously suited for use in a hydrogen-powered vehicle, i.e. in a vehicle having a hydrogen burner as the drive.

BRIEF DESCRIPTION OF THE DRAWINGS

The drawing shows design examples of a tank device according to the invention for storing a gaseous medium, in particular hydrogen. Here

DETAILED DESCRIPTION

Figure 1:
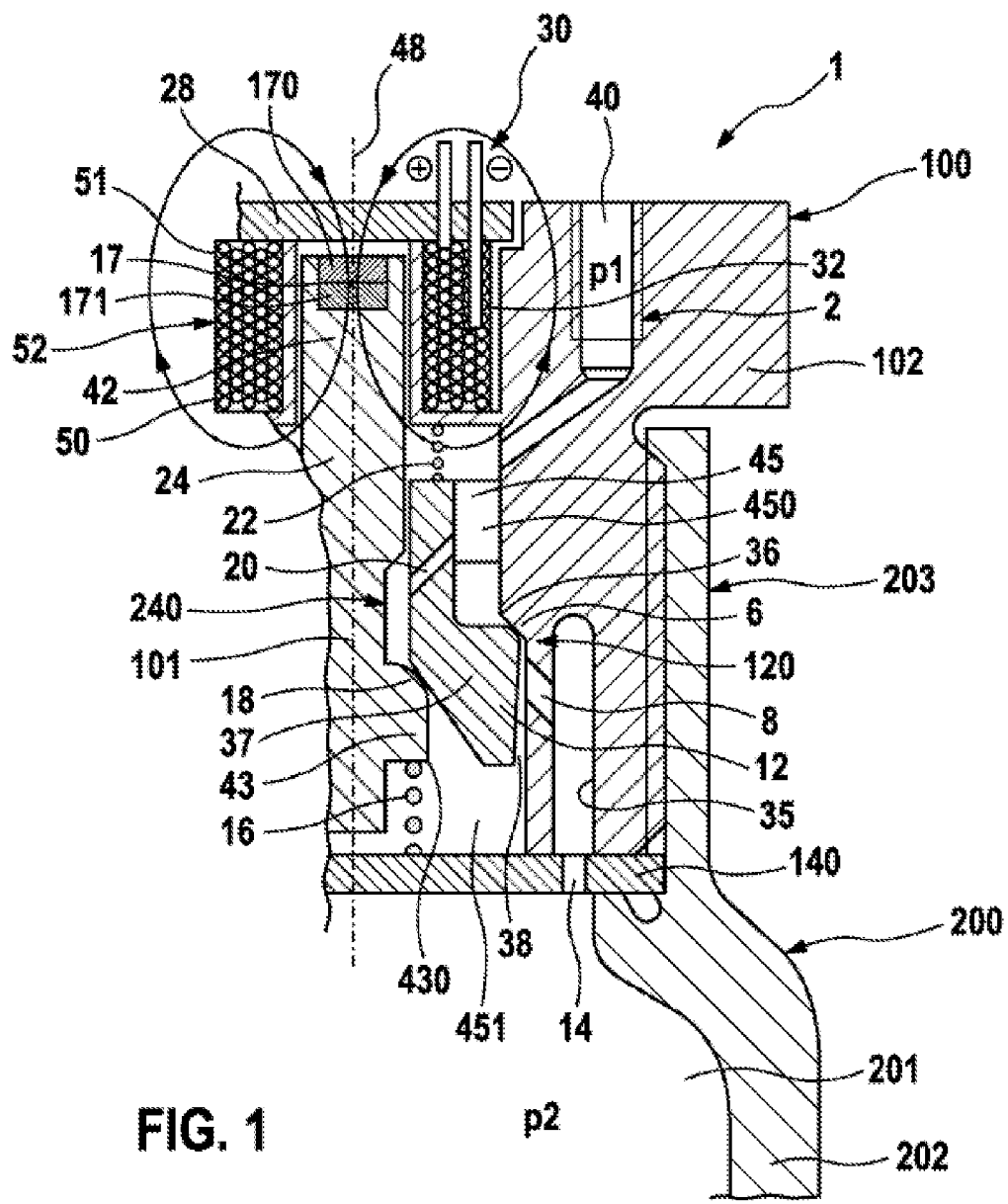
FIG. 1 shows a design example of a tank device according to the invention with a valve device in longitudinal section.
Figure 2:
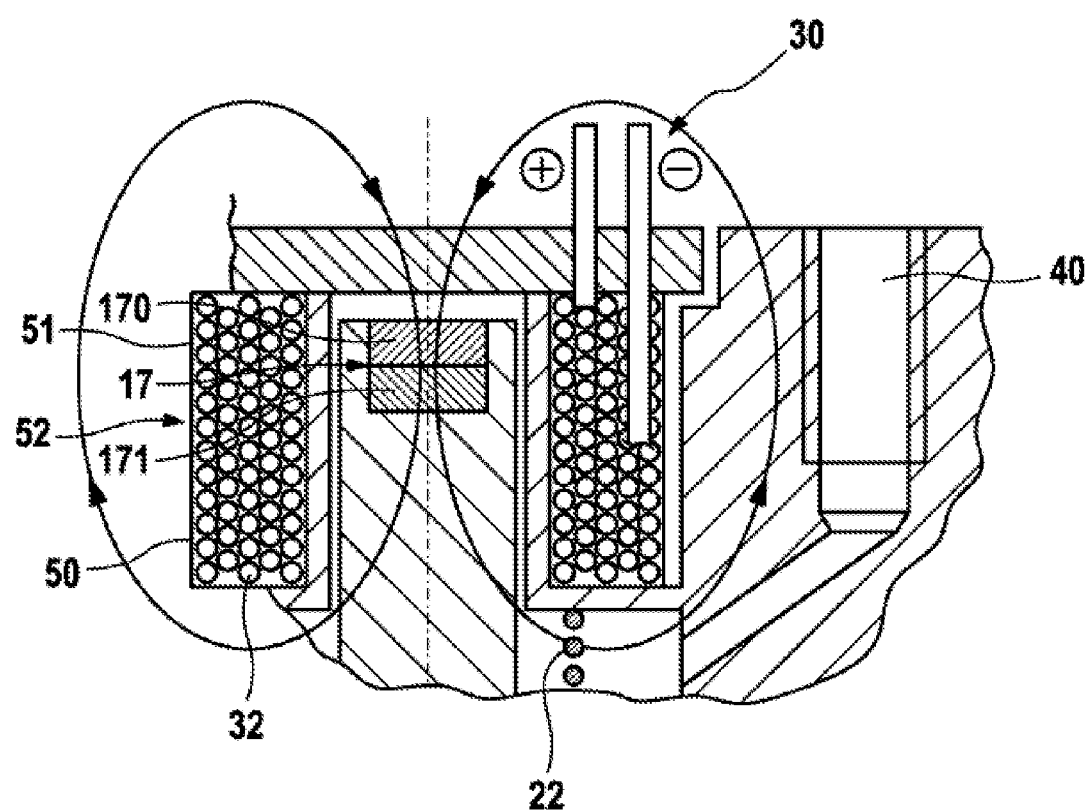
FIG. 2 shows an enlarged section of the tank device according to the invention of FIG. 1 in the region of the solenoid coil.

FIG. 1 shows a design example of a tank device 1 according to the invention having a longitudinal axis 48 in longitudinal section and in a simplified view, wherein the tank device 1 is configured such that it is rotationally symmetrical about the longitudinal axis 48.

The tank device 1 comprises a tank container 200 and a valve device 100, wherein the valve device 100 is partially received in the tank container 200. The tank container 200 comprises a tank container housing 202, in which a tank container interior 201 is configured.

The tank container 200 further comprises a neck region 203, in which the valve device 100 is partially received. The valve device 100 is supported on a tank base 140 which is disposed between the neck region 203 and the tank container interior 201 and the tank container interior 201 is thus delimited from the neck region 203.

The valve device 100 comprises a valve housing 102, in which a solenoid coil 32 that can be supplied with current by means of an electrical connector 30 is disposed. The feedthrough of the electrical connector 30 is configured in a magnetizable housing cover 28.

A permanent magnet 17 comprising a positive pole element 170 and a negative pole element 171 is disposed at one end 42 of the pilot valve element 24. The positive pole element 170 of the permanent magnet 17 faces in the direction of the housing cover 28 of the valve device 100 and the negative pole element 171 of the permanent magnet 17 is disposed in the direction of the tank container 200. The permanent magnet 17 is furthermore disposed in the valve device 100 such that said permanent magnet is disposed in a positive pole region 51 of a permanent magnetic field 52 generated by the solenoid coil 32 when the solenoid coil 32 is energized.

In addition, the housing cover 28 here is made of a non-magnetic material in order to guide the magnetic force fields, and thus the direction of movement of the pilot valve element 24, in the direction of the tank container interior 201 when the solenoid coil 32 is energized.

An interior space 45, in which a pilot valve element 24 and a main valve element 12 are disposed, is furthermore configured in the valve housing 102.

The pilot valve element 24 is disposed coaxially to the longitudinal axis 48 and comprises stepped recesses and a rounded shoulder 43 which is configured on an opposite end as a step 430. A spring 16 is supported on this step 430, which is also supported on the tank base 140 and applies a force to the pilot valve element 24 in the direction of the solenoid coil 32 (in FIG. 1 upward).

A main valve element 12, which is substantially L-shaped having a projection 37, is disposed parallel to the pilot valve element 24. The main valve element 12 additionally comprises a passage opening 20, via which a first partial interior space 450 and a second partial interior space 451 are fluidically connectable. The interior space 45 is divided by the main valve element 12 into the first partial interior space 450 and the second partial interior space 451.

The main valve element 12 is pretensioned by a spring 22 and is pressed against the rounded shoulder 43 by said spring, whereby the spring 22 is supported on the valve housing 102. Consequently, a first sealing seat 18 is configured on the main valve element 12 and cooperates with the main valve element 12 to open and close a connection between the first partial interior space 450 and the second partial interior space 451, and therefore to open and close the passage opening 20, and thus forms a pilot valve 240.

The pilot valve element 24 applies a force to the main valve element 12 against the force of the spring 22 and thus presses it with its projection 37 against a second sealing seat 6 which is conically formed on the valve housing 102. The closing force is assisted by the pressure in the tank container interior 201 and the force of the spring 16. The closing force ensures that the main valve element 12 is securely closed when it is switched off and not energized. As a result, the main valve element 12 cooperates with the second sealing seat 18 to open and close a passage opening 8 configured in the valve housing 102 and thus forms a main valve 120.

A throttle channel 38 is configured between the valve housing 102 and the projection 37 of the main valve element 12 and has a conical widening counter to the direction of the second sealing seat 6 by means of which a throttle effect is created.

The passage opening 8 is configured at the level of the throttle channel 38 and opens into the throttle channel 38. The passage opening 8 moreover opens into a chamber 35 configured in the valve housing 102, which is connected to the tank container interior 201 via removal openings 14 configured in the tank base 140.

The first partial interior space 450 is connected by means of a spill channel 2 configured in the valve housing 102 to an inflow line 40 which can be connected to an inflow region of a consumer system. The system pressure $p_1$ develops in the spill channel 2.

The tank device 1 functions as follows: When the solenoid coil 32 is not energized, the first sealing seat 18 and the second sealing seat 6 are closed, so that no gaseous medium, here hydrogen, can flow from the tank container interior 202 via the valve device 100 into the inflow line 40, for example, in the direction of an inflow region of the consumer system.

When the solenoid coil 32 is energized via the electrical connector 30, a permanent magnetic field 52 comprising a positive pole region 51 and a negative pole region 50 is formed. The permanent magnet 17 is located in the positive pole region 51 of the permanent magnetic field 52 generated by the solenoid coil 32. Due to the repelling magnetic forces of the permanent magnet 17 in the permanent magnetic field 52, the pilot valve element 24 moves away from the housing cover 28, thereby compressing the spring 16. The longitudinal movement of the pilot valve element 24 lifts it off the first sealing seat 18 and thus releases an opening cross-section from the second partial interior space 451 into the first partial interior space 450 and the passage opening 20.

The second partial interior space 451 is fluidically connected to the tank container interior 201 via the removal opening 14, the chamber 35, the passage opening 8 and the throttle channel 38 so that it is filled with hydrogen. The outflow of hydrogen in the direction of the spill channel 2 and thus into the inflow line 40 creates a compensating pressure level around the main valve element 12 depending on the removal of medium by the pressure system.

Due to the structural design of the throttle channel 38 as a throttle, more medium, here hydrogen, will flow out via the passage opening 20 during the opening process than can flow in via the throttle channel 38. Thus, an additional opening force acts on the main valve element 12. The pressure in the second partial interior space 451 is furthermore lowered.

After a short opening time of the first sealing seat 18, the pilot valve element 24 is pressure balanced, which results in a pressure balance of the main valve element 12.

The force of the spring 22 assists the release of the second sealing seat 6, because it forces the main valve element 12 into opening force so that the main valve element 12 lifts off the second sealing seat 6 and releases an opening cross-section between the passage opening 8 and the first partial interior space 450. Therefore, hydrogen now flows from the tank container interior 201 via the passage opening 8 directly into the first partial interior space 450 in the direction of the spill channel 2 and thus into the inflow line 40.

The first sealing seat 18 and the second sealing seat 6 are now released and hydrogen flows through both opening cross-sections from the tank container interior 201 via the valve device 1 into the inflow line 40, for example, in the direction of the inflow region of the consumer system.

If the opening cross-section on the first sealing seat 18 is smaller than the opening cross-section on the second sealing seat 6, only small magnetic forces are needed for the opening process of the pilot valve element 24 at the first sealing seat 18.

If the energization of the solenoid coil 32 is interrupted, the permanent magnetic field 52 and with it the repelling magnetic forces of the permanent magnet 17 and the permanent magnetic field 52 of the solenoid coil 32 collapse and a closing force on the pilot valve element 24 and the main valve element 12 is introduced via the spring 16. Depending on the applied pressure $p_2$, such as 15 to 1000 bar, for example, in the tank container interior 201, the closing force is introduced together with the pressure in the neck region 203 of the tank device 1 via the pilot valve element 24 and the first sealing seat 18 to the main valve element 12 with the second sealing seat 6.

Both the first sealing seat 18 and the second sealing seat 6 are now blocked again, so that no more hydrogen can flow from the tank container interior 201 via the valve device 100, for example in the direction of the inflow region of the consumer system. This principle of independent closing works even in an emergency if the power supply is interrupted. However, it should be noted here that the force of the spring 22, which acts counter to the desired flow of force, must not be selected too high and must be adjusted accordingly. Thus, in an emergency, it is ensured that no hydrogen can escape from the tank device 1.

During refueling, the spill channel 2 is provided with pressure via a connected tank unit, for example a filling station. The applied pressure in the spill channel 2 is thereby greater than in the rest of valve device 100. Due to the different pressure level, the pressure ratio at the second sealing seat 6 is greater than in the rest of the valve device 100, so that the main valve element 12 presses the pilot valve element 24 against the force of the spring 16 in the direction of the tank container interior 201. The tank device 1 can now be filled via the released second sealing seat 6 and via the passage opening 8 until the refueling process is completed. When the refueling process is ended, no further filling takes place, so that the pressure around the main valve element 12 equalizes. The force of the spring 16 together with the resulting differential pressure of $p_2 > p_1$ again ensures a closing of the first sealing seat 18 and the second sealing seat 6.

The tank device 1 for storing a gaseous medium can be used not only in fuel cell-powered vehicles, but, for example, also for hydrogen storage in vehicles having a hydrogen burner as the drive.

The invention claimed is:

1. A Tank device (1) for storing a gaseous medium comprising a valve device (100) and a tank container (200), wherein the valve device (100) comprises a valve housing (102), in which valve housing (102) a pilot valve element (24) that can be moved along a longitudinal axis (101) of the tank container (100) is disposed, which pilot valve element (24) cooperates with a first sealing seat (18) to open and close a passage opening (20) and thus forms a pilot valve (240), wherein the valve device (2) comprises a solenoid coil (32) operable to move the pilot valve element (24) along the longitudinal axis (101) of the tank device (1), wherein a main valve element (12) is disposed in the valve housing (102), which main valve element (12) cooperates with a second sealing seat (6) to open and close a passage opening (8) and thus forms a main valve (120), wherein the second sealing seat (6) is configured as a conical shoulder (36) on the valve housing (102), wherein a permanent magnet (17) is disposed at one end (42) of the pilot valve element (24), which permanent magnet (17) is disposed in the valve device (100) such that a positive pole element (170) of the permanent magnet (17) is disposed in a direction of a housing cover (28) of the valve device (100) and a negative pole element (171) of the permanent magnet (17) is disposed in a direction of the tank container (200), wherein the permanent magnet (17) is disposed in a positive pole region (51) of a permanent magnetic field (52) generated by the solenoid coil (32) when the solenoid coil (32) is energized.

2. The tank device (1) according to claim 1, wherein the valve device (2) can be opened in the direction of the tank container (200) when the solenoid coil (32) is energized.

3. The tank device (1) according to claim 1, wherein, between the valve housing (102) and a projection (37) of the main valve element (12), which projection (37) cooperates with the second sealing seat (6) to open and close the passage opening (8), a throttle channel (38) is configured, which throttle channel (38) has a conical widening counter to a direction of the second sealing seat (6) by which a throttle effect is created.

4. The tank device (1) according to claim 3, wherein the passage opening (8) in the valve housing (102) is configured at a level of the throttle channel (38) and opens into the throttle channel (38).

5. The tank device (1) according to claim 3, wherein a chamber (35) is configured in the valve housing (102), which chamber (35) is connected to the throttle channel (38) by the passage opening (8).

6. The tank device (1) according to claim 5, wherein the valve device (100) is disposed in a neck region (203) of the tank device (1) and is pressed against a tank base (140) within the neck region (203).

7. The tank device (1) according to claim 6, wherein a removal opening (14) which fluidically connects a tank container interior (201) and the chamber (35) is configured in the tank base (140).

8. The tank device (1) according to claim 1, wherein the pilot valve element (24) comprises a shoulder (43), on which shoulder (43) a spring (16) is supported and applies a force to the pilot valve element (24) in a direction of the one end (42) of the pilot valve element (24).

9. The tank device (1) according to claim 1, wherein the first sealing seat (18) is configured on the main valve element (12).

10. The tank device (1) according to claim 1, wherein the main valve element (12) is subjected to a force in a direction of the tank container interior (201) by a spring (22), whereby the main valve element (12) is subjected to a force in a direction of the first sealing seat (18) and counter to a direction of the second sealing seat (6).

11. The tank device (1) according to claim 1, wherein an interior space (45) is configured in the valve housing (102), which interior space (45) is divided by the main valve element (12) into a first partial interior space (450) and a second partial interior space (451).

12. The tank device (1) according to claim 11, wherein the first partial interior space (450) is connected by means of a spill channel (2) configured in the valve housing (102) to an inflow line (40), which inflow line (40) can be connected to an inflow region of a consumer system.

13. The tank device (1) according to claim 11, wherein the first partial interior space (450) and the second partial interior space (451) are fluidically connectable by the first sealing seat (18) and/or the second sealing seat (6).

14. The tank device (1) according to claim 1, wherein the gaseous medium is hydrogen.

15. A fuel cell system having a tank device (1) for storing hydrogen for operating a fuel cell according to claim 1.

16. A fuel cell-powered vehicle having a tank device (1) for storing hydrogen for operating a fuel cell according to claim 1.

* * * * *